United States Patent
Tsuchiya et al.

(10) Patent No.: US 11,541,341 B2
(45) Date of Patent: Jan. 3, 2023

(54) DUST FILTER

(71) Applicant: AISAN KOGYO KABUSHIKI KAISHA, Obu (JP)

(72) Inventors: Takumi Tsuchiya, Ichinomiya (JP); Norihiro Kondo, Toyota (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 65 days.

(21) Appl. No.: 17/188,937

(22) Filed: Mar. 1, 2021

(65) Prior Publication Data
US 2021/0291099 A1 Sep. 23, 2021

(30) Foreign Application Priority Data
Mar. 17, 2020 (JP) .............................. JP2020-046218

(51) Int. Cl.
*B01D 46/00* (2022.01)

(52) U.S. Cl.
CPC ..... *B01D 46/0031* (2013.01); *B01D 46/0002* (2013.01)

(58) Field of Classification Search
CPC ............ B01D 46/0031; B01D 46/0002; B01D 46/0089; B01D 45/02; B01D 2279/40; B60K 2015/03236; B60K 15/03504; B60K 2015/03514; B60K 2015/03538; B60K 2015/0458; B60K 2015/047; F02M 25/0872
See application file for complete search history.

(56) References Cited

U.S. PATENT DOCUMENTS

| | | | | |
|---|---|---|---|---|
| 5,058,693 | A * | 10/1991 | Murdock | B60K 15/03504 55/318 |
| 7,699,042 | B2 * | 4/2010 | Steinman | B01D 50/20 123/516 |
| 10,767,607 | B2 * | 9/2020 | Martin | B01D 46/58 |
| 2012/0012080 | A1 * | 1/2012 | Dong | B01D 46/2411 55/307 |
| 2015/0151632 | A1 * | 6/2015 | Fujiwara | B60K 15/04 220/86.2 |
| 2015/0152816 | A1 * | 6/2015 | Fujiwara | B60K 15/03504 137/587 |
| 2019/0152314 | A1 * | 5/2019 | Sakai | B60K 15/03519 |

FOREIGN PATENT DOCUMENTS

JP  2009216068 A  9/2009
JP  2011256760 A * 12/2011 ............. F02M 25/08

* cited by examiner

*Primary Examiner* — Hung Q Nguyen
(74) *Attorney, Agent, or Firm* — Conley Rose, P.C.

(57) ABSTRACT

A dust filter includes a filter medium configured to filter foreign substances, such as dust, from atmospheric air. The dust filter also includes a case within which the filter medium is disposed. A first chamber in the case on one side of the filter medium defines a clean side, and a second chamber in the case on the other side of the filter medium defines a dirty side. The case includes a first port that provides fluid communication between the first chamber and the air passage, and a second port that provides fluid communication between the second chamber and the surrounding atmosphere. The second port is configured to allow water accumulated in the case to drain to the outside of the case by gravity while the case is mounted on the vehicle.

11 Claims, 5 Drawing Sheets

DUST FILTER

CROSS-REFERENCE TO RELATED APPLICATIONS

This application claims priority to Japanese patent application serial number 2020-046218 filed Mar. 17, 2020, the contents of which is incorporated herein by reference in its entirety for all purposes.

BACKGROUND

The present disclosure relates to a dust filter provided in an atmospheric passage for introducing atmospheric air into an evaporated fuel treatment device of a vehicle.

Conventionally, a dust filter including a filter medium disposed in a case will often have two chambers as disclosed in Japanese Laid-Open Patent Publication No. 2009-216068. A first chamber serves as a clean side and is disposed on one side of the filter medium in the case, and a second chamber serves as a dirty side and is disposed on the other side of the filter medium in the case. The first chamber is connected to a canister of an evaporated fuel treatment device. An atmosphere introduction port of the second chamber is connected to an atmospheric passage. Water in the atmosphere may condense and accumulate in the case. Accordingly, a drainage port is provided in the second chamber so as to drain the accumulated water.

SUMMARY

In accordance with an aspect of the present disclosure, a first embodiment may include a dust filter configured to be disposed along an atmospheric passage for introducing atmospheric air into a fuel vapor treatment device comprises a filter medium and a case. The filter medium is configured to filter foreign substances, such as dust, from the atmospheric air flowing through the atmospheric passage. The filter medium is secured within the case. The filter medium may divide the inside of the case into a first chamber disposed within the case on one side of the filter medium and a second chamber within the case on the other side of the filter medium. The first chamber may define a clean side of the filter medium and the second chamber may define a dirty side filer medium. The case may include a first port and a second port. The first port may be a communication port for providing fluid communication between the first chamber and the atmospheric passage. The second port may be a communication port for opening the second chamber to the surrounding atmosphere. The second port may be configured such that water accumulated in the case can be drained to the outside of the case by gravity in a state where the case is mounted on a vehicle.

In the first embodiment, the second port may have a cylindrical or square cylinder shape protruding from the case. Alternatively, the second port may merely form a hole in a wall of the case. Further, it is preferable that the second port is positioned proximal or at the bottom of the case in the state where the case is mounted on the vehicle so that the water does not remain in the case. However, the second port is not limited to the above-mentioned position.

According to the first embodiment, the second port may function as an atmosphere introduction port for introducing the atmospheric air into the case. The second port may also function as a drainage port for draining the water accumulated in the case to the outside. The case may have no openings other than the first port and the second port. Therefore, when performing an airtight performance confirmation test for the evaporated fuel treatment device, it is not necessary to take measures to prevent air leakage from an extra opening, such as a distinct and dedicated drain port. As a result, workability during the testing may be improved. In addition, since the second port serves as both the atmosphere introduction port and the drainage port, the case configuration may be simplified.

In accordance with another aspect of the present disclosure, a second embodiment may include the dust filter according to the first embodiment, wherein the second port may include a tubular body comprising a communication passage having an entrance and an exit at each end of the communication port. The tubular body may be provided so as to project from the case. The second port may be arranged so that a protruding-side end part of the tubular body is lower than a case-side end part of the tubular body in a state where the case is mounted on the vehicle.

According to the second embodiment, since the second port is the tubular body protruding outwards from the case, it is possible to facilitate coupling of a connector to the second port when performing the airtight performance confirmation test for the evaporated fuel treatment device. The connector is for supplying air, which has a pressure higher than the atmospheric pressure, to the second chamber.

In accordance with another aspect of the present disclosure, a third embodiment may include the dust filter according to the first or second embodiment, wherein the second port may be provided with a mesh. The mesh may be arranged across the communication port and may have a plurality of small holes in a grid pattern.

According to the third embodiment, since the mesh is provided across the communication passage of the second port, it is possible to prevent foreign substances, such as dust larger than the small hole of the mesh, from infiltrating the case via the second port.

In accordance with another aspect of the present disclosure, a fourth embodiment may include the dust filter according to the third embodiment, wherein the small hole of the mesh may be formed in an inclined shape such that the opening area of each small hole gradually decreases from the inside to the outside of the case.

According to the fourth embodiment, since the small holes of the mesh have a smaller opening area on the outside of the case than on the inside, the infiltration of water or the like from the outside of the case may be suppressed. On the other hand, since the small hole of the mesh has a larger opening area on the inside of the case than on the outside, the water accumulated in the case may be drained easily.

In accordance with another aspect of the present disclosure, a fifth embodiment may include the dust filter according to the fourth embodiment, wherein the wall surface on the lower side, among the annular wall surfaces forming the small hole of the mesh, has a smaller relative angle to a center line of the small hole than the wall surface on the upper side.

According to the fifth embodiment, the wall surface on the lower side, among the annular wall surfaces forming the small hole of the mesh, may have a smaller relative angle to the center line of the small hole than the wall surface on the upper side in the state where the case is mounted on the vehicle. Therefore, the drainage performance of the water accumulated in the case on the wall surface on the lower side may be improved.

In accordance with another aspect of the present disclosure, a sixth embodiment may include the dust filter according to any one of the third to fifth embodiments, wherein at least one of the small holes of the mesh may be provided with a backflow prevention means. The backflow prevention means may be configured to enable the water inside of the case to drain and may also suppress the infiltration of foreign substances, such as water, from the outside of the case.

In the sixth embodiment, the backflow prevention means may be a check valve or the like.

According to the sixth embodiment, the backflow prevention means may allow the water accumulated in the case to be drained via the small hole, and suppress the infiltration of foreign substances such as water from the outside of the case.

In accordance with another aspect of the present disclosure, a seventh embodiment may include the dust filter according to any one of the second to sixth embodiment, wherein the dust filter may include a shield. The shield may be provided inside the tubular body of the second port. The shield may block the upper part of the cross section of the communication passage. The shield may not block the lower part of the cross section of the communication passage. The shield may suppress the infiltration of foreign substances, such as water, from the outside of the case in the state where the case is mounted on the vehicle.

In the seventh embodiment, the shield may be composed of a plate fixed to the inner wall surface of the tubular body, so as to cross the communication passage. Alternatively, the shield may be formed by deforming the wall surface constituting the tubular body such that the side where the communication passage is narrowed. Further, the position of the shield in the communication passage may be on the second chamber side with respect to the mesh, or may be on the other side.

According to the seventh embodiment, since the shield is provided inside the tubular body of the second port, it is possible to prevent water or the like from infiltrating from outside the case via the second port. Further, the lower part of the communication passage is open, even though the shield may block the upper part of the communication passage. As a result, the shield does not prevent the drainage of the water accumulated in the case through the second port.

In accordance with another aspect of the present disclosure, an eighth embodiment may include the dust filter according to any one of the second to seventh embodiment, wherein the tubular body of the second port may have a shape that can be directly coupled to the connector. The connector is for supplying air having a pressure higher than atmospheric pressure to the second chamber when performing the airtight performance confirmation test for the evaporative fuel treatment device.

According to the eighth embodiment, the second port has a shape that can be directly coupled to the connector when performing the airtight performance confirmation test for the evaporated fuel treatment device. Therefore, when performing the airtight performance confirmation test, the work of coupling the connector to the second port may be relatively easy, and the workability of the test may be improved.

DETAILED DESCRIPTION

To ensure an evaporated fuel treatment device is functioning normally, it is typically necessary to check that each part of the evaporated fuel treatment device is airtight. In particular, each country generally requires an airtight performance confirmation test for evaporated fuel treatment devices. In one of the airtight performance confirmation tests, air with a pressure greater than atmospheric pressure is supplied to a dust filter and an atmospheric passage to check for air leakage in the evaporated fuel treatment device. To perform the test, it was previously necessary to manually close a drainage port so that a false leak detection did not occur via leakage of air through the drainage port.

However, closing the drainage port of many conventional dust filters may be cumbersome.

Therefore, there has been a need to avoid the work necessary to prevent air leakage through the drainage port when performing the airtight performance confirmation tests of evaporated fuel treatment devices. In some embodiments of the present disclosure, this may be accomplished by integrating or combining the atmosphere introduction port and the drainage port of the case of the dust filter.

In order to solve issues pertaining to the above subject, embodiments of dust filters of the present disclosure will now be described in connection with the figures.

Figure 1:
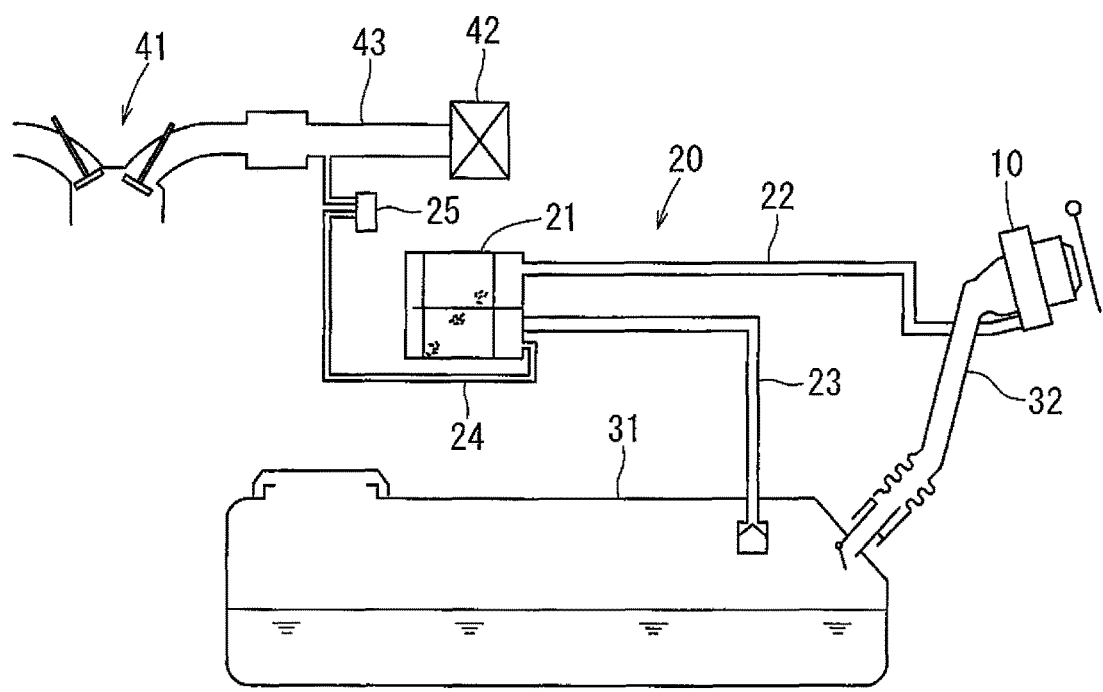
FIG. 1 is a schematic view of a system including an evaporated fuel treatment device of a vehicle.

FIG. 1 shows a system including an evaporated fuel treatment device 20. The evaporated fuel treatment device 20 includes a dust filter 10 according to a first embodiment. In addition, the evaporated fuel treatment device 20 includes a canister 21 configured to adsorb an evaporated fuel generated in a fuel tank 31. The evaporated fuel adsorbed by the canister 21 may then be burned in an engine 41. A vapor passage 23 communicates evaporated fuel in the fuel tank 31 to the canister 21. The canister 21 is also in fluid communication with an intake passage 43 via a purge passage 24. The intake passage 43 supplies atmospheric air taken in from an air cleaner 42 to the engine 41. A purge control valve 25 is disposed along the purge passage 24 and controls the amount of evaporated fuel supplied from the canister 21 to the intake passage 43. Atmospheric air may be required to supply the evaporated fuel adsorbed by the canister 21 to the engine 41. In this embodiment, atmospheric air is supplied to the canister 21 via a dust filter 10 and an atmospheric passage 22 extending from the dust filter 10 to the canister 21. The dust filter 10 is fixably attached to the outer periphery of an inlet pipe 32 that supplies fuel to the fuel tank 31.

Figure 2:
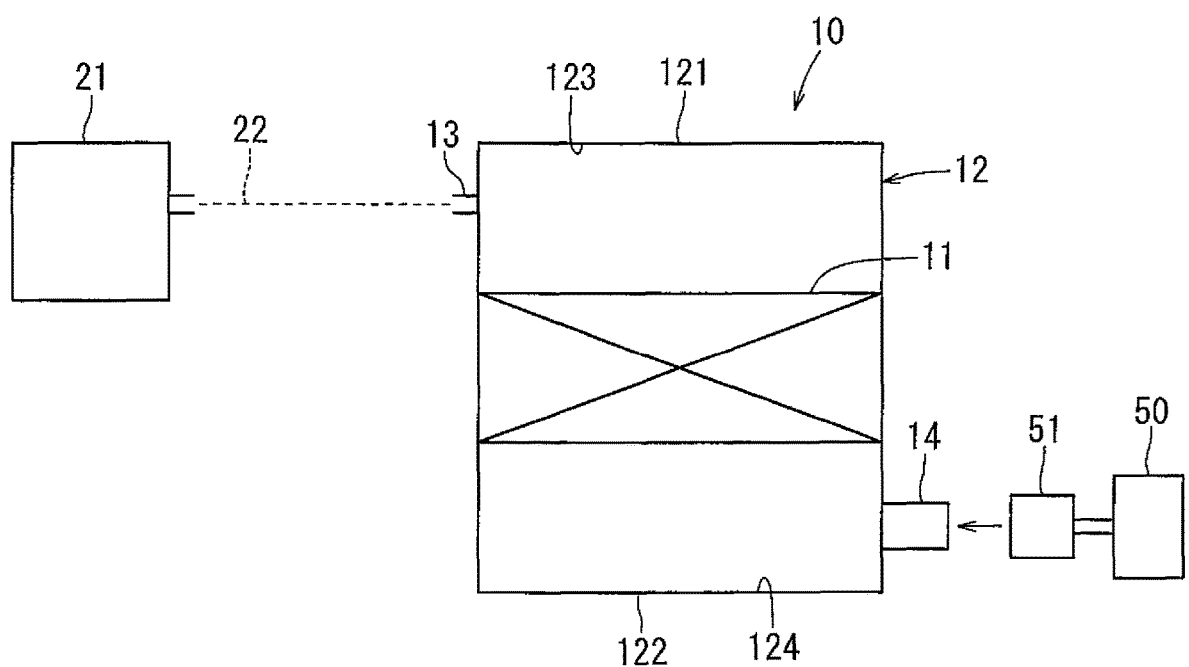
FIG. 2 is a schematic view of the dust filter of FIG. 1.

FIG. 2 is a schematic view of the dust filter 10 according to the first embodiment. The dust filter 10 includes a case 12 defining a closed internal space. A filter medium 11 is fixably disposed in a central portion of the case 12, thereby separating the internal space within the case 12 into two chambers—a first chamber 123 is formed in the internal space of the case 12 on one side of the filter medium 11 and a second chamber 124 is formed in the internal space of the case 12 on the other side of the filter medium 11. The first chamber 123 defines a "clean" side of the filter medium 11 and the internal space of the case 12, and the second chamber 124 defines a "dirty" side of the filter medium 11 and the internal space of the case 12. A first case portion 121 of the case 12 forms the first chamber 123 and includes a first port 13. A second case portion 122 of the case 12 forms the second chamber 124 and includes a second port 14. Both the first port 13 and the second port 14 may have a tubular shape. A fluid communication path is formed within the dust filter 10. In particular, the ends of the first port 13 and the second port 14 function as an exit and entrance, respectively, of the communication path in the dust filter 10. The first port 13 is a communication port for providing fluid communication between the first chamber 123 and the canister 21 via the atmospheric passage 22. The second port 14 is a communication port for opening the second chamber 124 to the atmosphere. Therefore, atmospheric air may be introduced into the second chamber 124 via the second port 14. Foreign substances in the atmospheric air are filtered and cleaned by the filter medium 11. Then, the filtered atmospheric air passes through the first chamber 123, and may be supplied to the canister 21, via the first port 13.

FIGS. 3 to 6 show the dust filter 10 according to the first embodiment. The case 12 of the dust filter 10 may be configured by joining the first case portion 121 and the second case portion 122, with the filter medium 11 disposed therebetween. The first case portion 121 and the second case portion 122 may be joined by any suitable joining means, such as welding or snap-fit at a contact portion. The first case portion 121 may have a curved shape, in which a surface facing an outer periphery of an inlet pipe 32 is along an outer peripheral surface of the inlet pipe 32. Therefore, the first case portion 121 may be attached to the outer circumference of the inlet pipe 32. Correspondingly, the first chamber 123 may have a curved shape. As a result, the filter medium 11 and the second case portion 122 may also have a curved shape as a whole. The filter medium 11 may be configured by fitting a filter element 112 into a frame-shaped filter medium case 111, which is then seated in the case 12. The filter element 112 may be a known filter element, and may be made of, for example, a filter paper.

Figure 3:
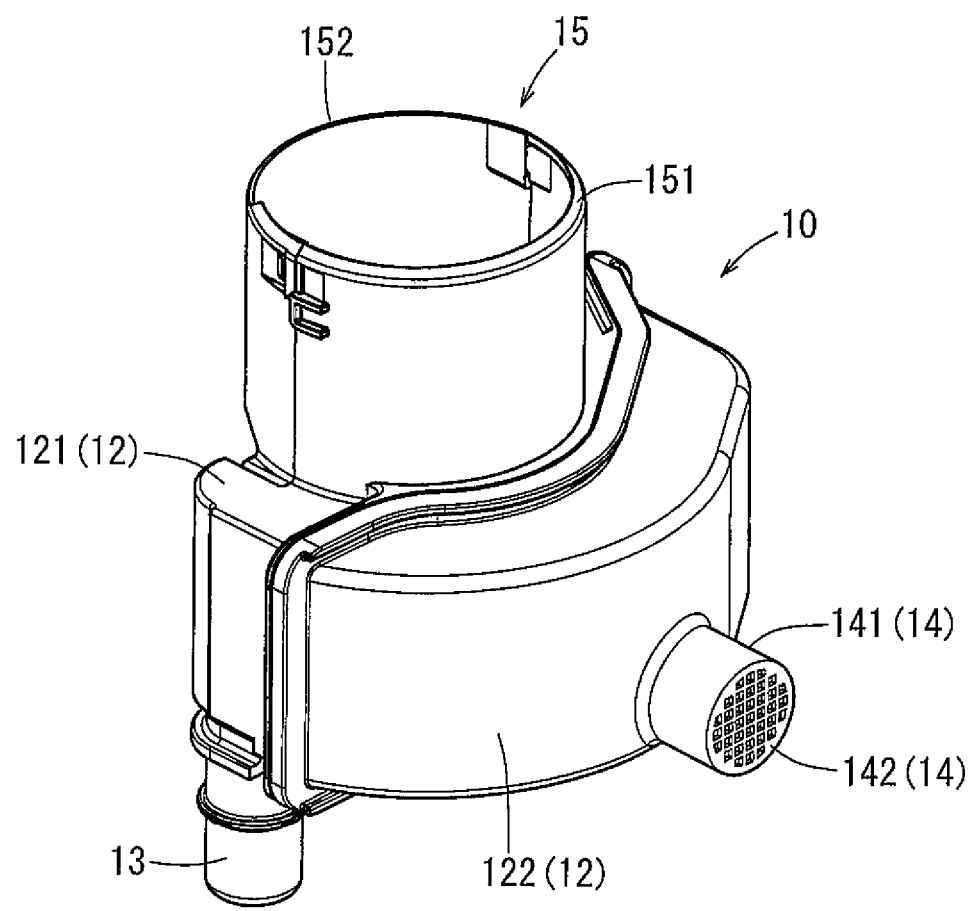
FIG. 3 is a perspective view of the dust filter of FIG. 1.
Figure 4:
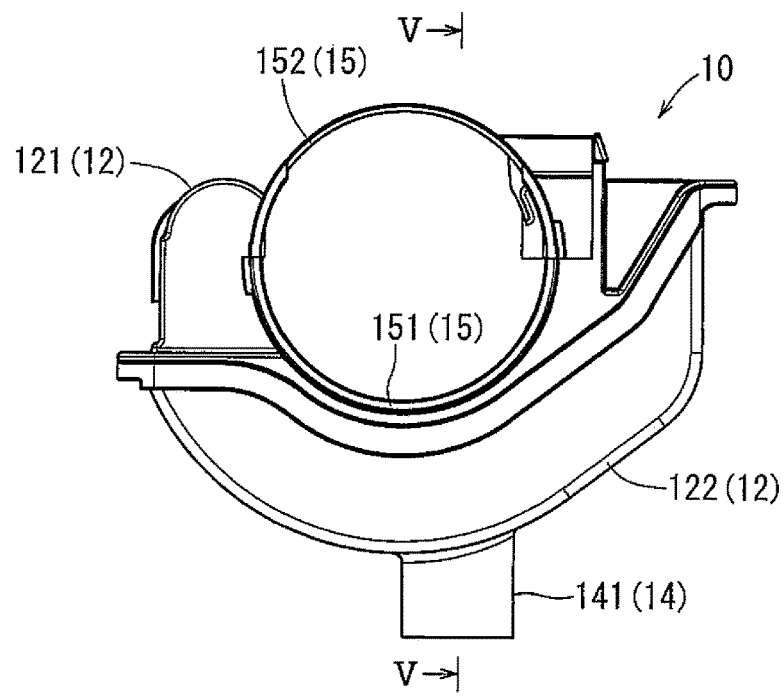
FIG. 4 is a plan view of the dust filter of FIG. 1.
Figure 5:
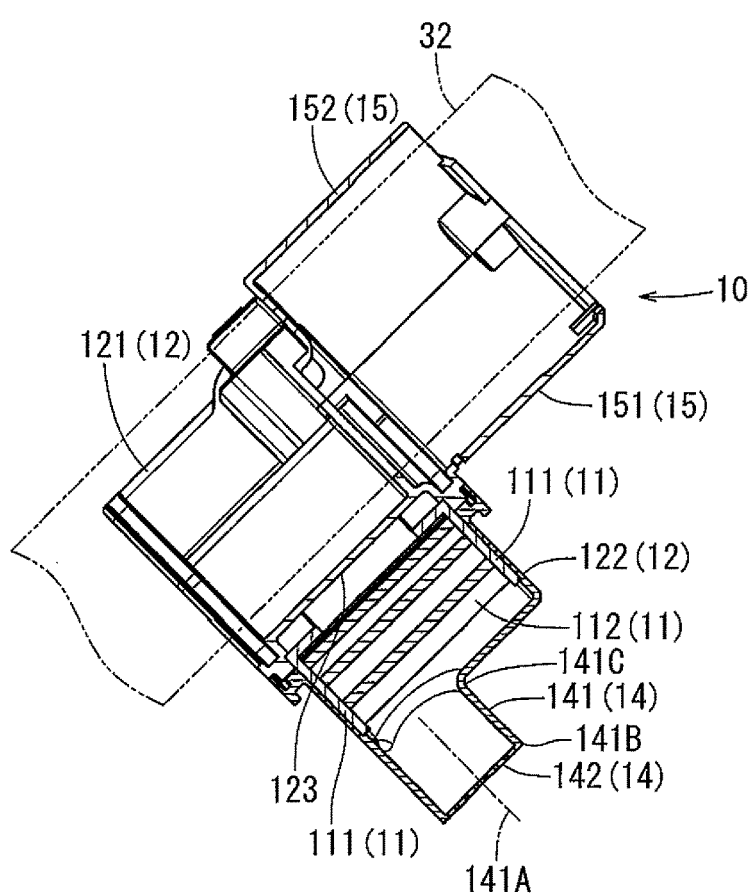
FIG. 5 is a cross-sectional view of the dust filter of FIG. 1 taken along the line V-V of FIG. 4 with the dust filter oriented in a state where the dust filter is mounted on a vehicle.

As shown in FIGS. 3 to 5, a first fastener 151 is integrally formed with an upper part of the first case portion 121 and a second fastener is integrally formed with an upper part of the second case portion 122. The first fastener 151 and the second fastener 152 are secured together to form a fastener 15 that couples the portions 121, 122 together. In this embodiment, the first fastener 151 and the second fastener 152 have substantially symmetrical semi-cylindrical shapes. Consequently, the fastener 15 has a cylindrical shape after the first fastener 151 and the second fastener 152 are combined. The fastener 15 is configured to wrap around the outer periphery of the inlet pipe 32. The first fastener 151 and the second fastener 152 may be connected to each other by a connecting tool. For instance, they may be connected such that they have a structure in which male and female portions are engaged with each other at a plurality of abutting parts.

The first case portion 121, the second case portion 122, the filter medium case 111, and the fastener 15 may be made of, for example, a resin, such as polypropylene or nylon.

As shown in FIG. 3, the first port 13 may be integrally formed with the first case portion 121. Further, as shown in FIG. 3, the second port 14 may be integrally formed with the second case portion 122. Both the first port 13 and the second port 14 may be composed of a hollow tubular body. The first port 13 is positioned so that the communication direction of the communication passage (i.e., the flow of fluids through the first port 13) is in the vertical direction in FIG. 3. Further, the second port 14 is positioned so that the communication direction of the communication passage (i.e., the flow of fluids through the second port 14) is in the lateral direction in FIG. 3.

Figure 6:
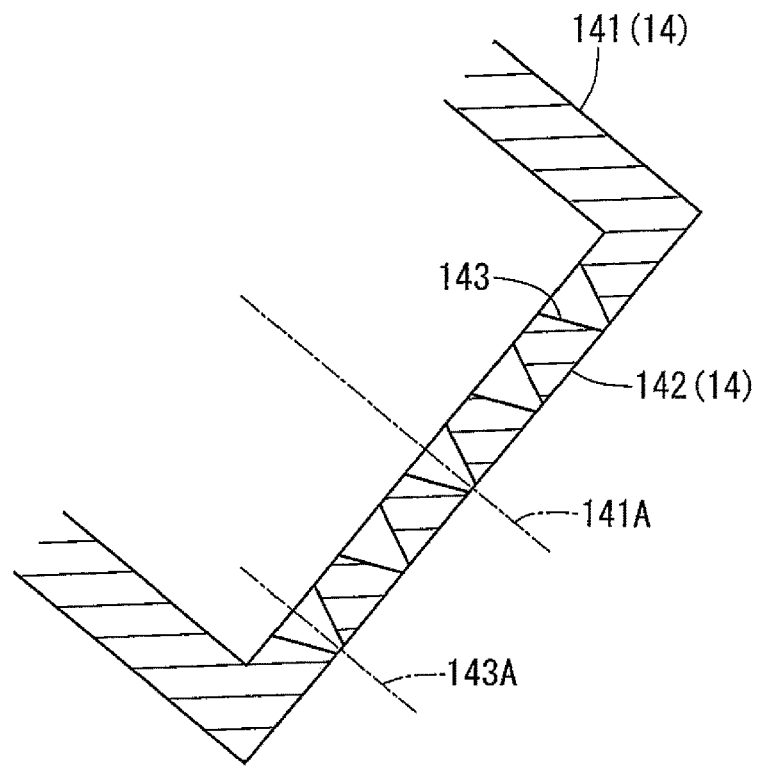
FIG. 6 is an enlarged longitudinal sectional view of the protruding-side end part of the second port of the dust filter of FIG. 5.

In this embodiment, a mesh 142 is integrally formed at the opening of a protruding-side end part 141B of a tubular body 141 defining the second port 14. Alternatively, the mesh 142 may be a separate body attached to the protruding-side end part 141B of the tubular body 141 by a suitable joining means. As shown in FIG. 6, a large number of small holes 143 are formed in the mesh 142, for example in a grid pattern. The second port 14 is configured to introduce atmospheric air into the second chamber 124 via the small holes 143 in the mesh 142. Each small hole 143 may be formed so that a central axis or center line 143A of each hole is aligned with the communication direction of the communication passage of the tubular body 141 (e.g., in a direction parallel to a central axis or center line 141A of the tubular body 141). Each small hole 143 may have a conical shape. The inner diameter of the small hole 143 may be greatest at the inside of the second chamber 124 (i.e., proximal the second chamber 124), and may become smaller towards the outside (i.e., distal the second chamber 124). Therefore, the wall surface defining each small hole 143 may be inclined with respect to the center line 141A. By forming the small holes 143 in the mesh 142 as described above, the water accumulated in the second chamber 124 may be easily drained. Additionally, the infiltration of foreign substances, such as dust, into the second chamber 124 may be suppressed.

FIG. 5 shows a state where the dust filter 10 is mounted on the outer periphery of the inlet pipe 32. As shown in FIG. 5, the tubular body 141 of the second port 14 is oriented so that the center line 141A of the tubular body 141 is inclined downwardly. That is, the height (measured from the ground) of the protruding-side end part 141B of the tubular body 141 less than the height (measured from the ground) of a case-side end part 141C of the tubular body 141. In other words, the protruding-side end part 141B of the tubular body 141 is positioned below the case-side end part 141C of the tubular body 141. Therefore, when water, which may be in the atmospheric air introduced into the second chamber 124, accumulates and adheres to the inner wall surface(s) defining the second chamber 124, the water may move along the inner wall surface of the tubular body 141 due to gravity. The water may then drop to the outside of the tubular body 141. In addition, foreign substances, such as dust, which may have entered into the second chamber 124, may be easily drained from the tubular body 141 due to vehicle vibration or along with the flowing water.

As for the airtight performance confirmation test for the evaporated fuel treatment device 20, the airtight performance confirmation test may be performed utilizing the atmospheric passage 22 connected to the dust filter 10 and the first port 13. As shown in FIG. 2, a connector 51 of an airtight performance confirmation tester 50 is connected to the second port 14, thereby closing the evaporated fuel treatment device 20 so that air does not leak from the opening, such as the atmosphere side of the atmospheric passage 22. An air pressure higher than atmospheric pressure is then supplied to the second chamber 124 to test for air leakage in the dust filter 10 and the atmospheric passage 22 based on a change in air pressure. The tubular body 141 of the second port 14 has a shape and dimensions so that the connector 51 can be directly connected thereto. Therefore, when performing the airtight performance confirmation test, connecting the connector 51 to the second port 14 is relatively easy, and the workability of the test may be improved.

As described above, the second port 14 may function not only as an atmosphere introduction port for introducing atmospheric air into the second case portion 122, but also as a drainage port for discharging water accumulated on the inner wall surface(s) defining the second chamber 124 of the second case portion 122 to the outside. Consequently, the case 12 does not need an opening other than the first port 13 and the second port 14. Accordingly, it is not necessary to take measures to prevent air leakage from an extra opening, such as a separately formed drain port, when performing the airtight performance confirmation test for the evaporated fuel treatment device 20. As a result, the work efficiency when performing the test may be improved. Moreover, since the second port 14 may serve as both the atmosphere introduction port and the drainage port, the configuration of the case 12 may be simplified.

Figure 7:
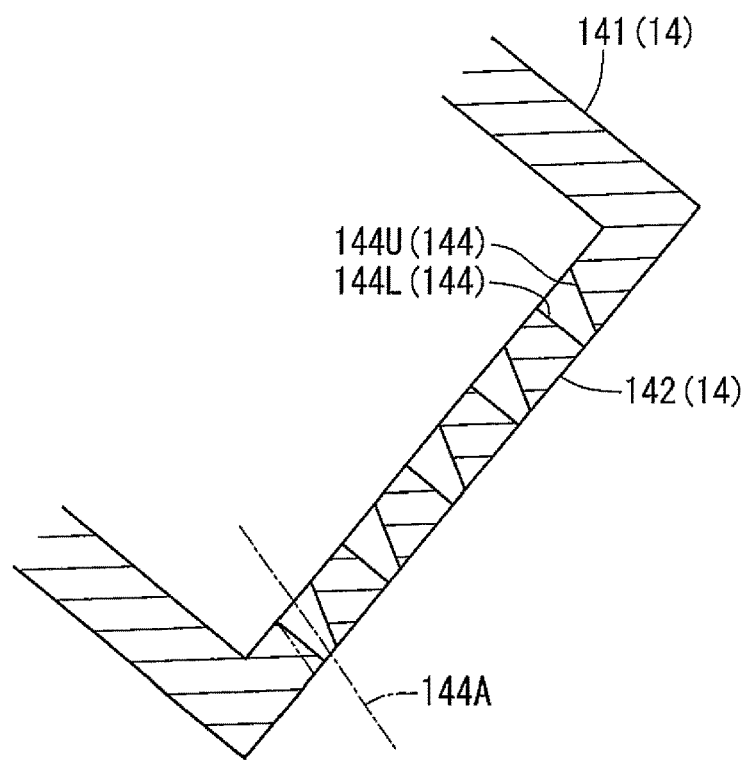
FIG. 7 is an enlarged longitudinal sectional view of a protruding-side end part of a second port of a second embodiment of a dust filter for an evaporated fuel treatment device of a vehicle.

FIG. 7 is an enlarged longitudinal sectional view of a protruding-side end part of a second port of a dust filter according to a second embodiment. A feature of the second embodiment, as compared to the first embodiment, is that the small holes formed in the mesh 142 are changed from the small holes 143 of the first embodiment to small holes 144 of the second embodiment. Since the other configurations of the second embodiment are substantially the same as those of the first embodiment, the description of the substantially same portions will be omitted.

The small holes 144 of the second embodiment (e.g., see FIG. 7) may have a deformed or canted conical shape, as compared to the conical shape of the small hole 143 of the first embodiment (e.g., see FIG. 6). For instance, in a side cross-sectional view, the small holes 144 may have a lower-side wall surface 144L, which is a wall on the lower side in the vertical direction, and an upper-side wall surface 144U, which is a wall on the higher side in the vertical direction. The upper-side and lower-side wall surfaces 144U, 144L are surfaces among the annular inner walls defining each of the small holes 144. The lower-side wall surface 144L is oriented at an angle to a center line 144A of the small hole 144 that is less than that of the upper-side wall surface 144U. Therefore, in a state where the dust filter 10 is mounted on the vehicle, for example as shown in FIG. 5, the drainage of the water accumulated in the case along the lower-side wall surface 144L may be improved.

Further, the inclination direction of the lower-side wall surface 144L with respect to the center line 144A may be the same as the inclination direction of the upper-side wall surface 144U with respect to the center line 144A (e.g., as shown by virtual line in FIG. 7). In this case, the drainage property of the water accumulated in the case along the lower-side wall surface 144L may be further improved.

Figure 8:
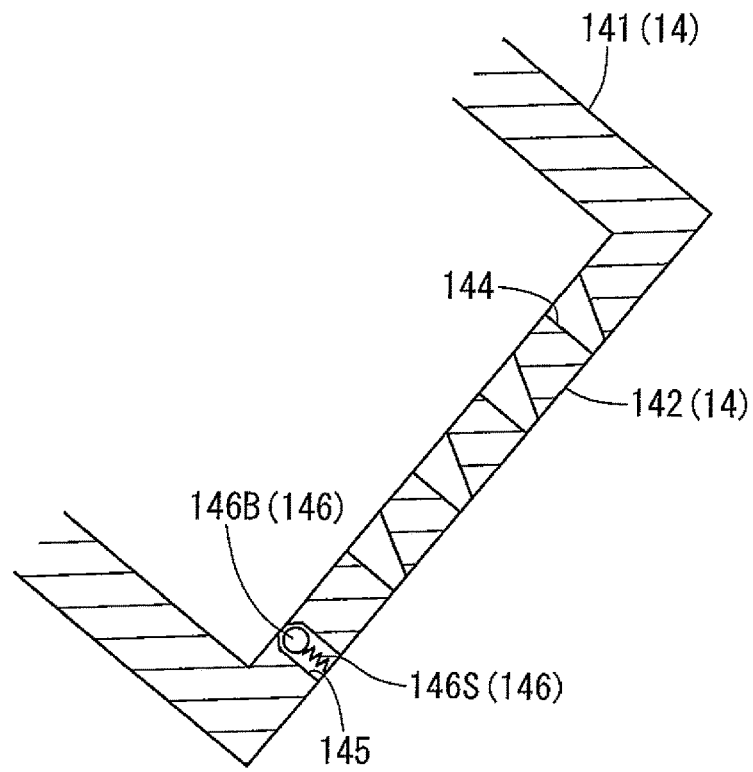
FIG. 8 is an enlarged longitudinal sectional view of a protruding-side end part of a second port of a third embodiment of a dust filter for an evaporated fuel treatment device of a vehicle.

FIG. 8 is an enlarged longitudinal sectional view of a protruding-side end part of a second port of a dust filter according to a third embodiment. A feature of the third embodiment, as compared to the second embodiment (e.g., see FIG. 7), is that the mesh 142 is provided with a check valve 146. The check valve 146 is configured as a backflow prevention means. Since the other configurations of the third embodiment are substantially the same as those in the second embodiment, the description of the substantially same portions will be omitted.

As shown in FIG. 8, a small hole 145 is formed in the mesh 142, in addition to the other small holes 144. The small hole 145 is formed at a low position in the mesh 142 (relative to the small holes 144) in the state where the dust filter 10 is mounted on the vehicle. The small hole 145 may have a cylindrical shape as a whole. However, the diameter of the small hole 145 is partially reduced on an end of the small hole 145 proximal the second chamber 124. A ball 146B is inserted into the small hole 145. The ball 146B is biased towards the the second chamber 124 by a spring 146S. Therefore, in a state where no other force is applied to the ball 146B, the ball 146B closes the small hole 145 in response to the energizing force of the spring 146S. Thus, the check valve 146 is composed of the small hole 145, the ball 146B, and the spring 146S. Although only one check valve 146 is shown in FIG. 8, a plurality of check valves may be provided in other embodiments.

According to the third embodiment, when the water accumulated on the inner wall surface(s) defining the second chamber 124 of the second case portion 122 gathers in the tubular body 141 of the second port 14, the ball 146B of the check valve 146 may move towards the outside of the second chamber 124, against the biasing force of the spring 146S, due to the water pressure. As a result, the water may be drained to the outside of the tubular body 141 via the small hole 145. On the other hand, when foreign substances, such as dust, try to enter the tubular body 141 via the small hole 145 of the check valve 146, the ball 146B of the check valve 146 may move towards the inside of the second chamber 124. As a result, the small hole 145 may be closed, thereby preventing foreign substances from entering.

Figure 9:
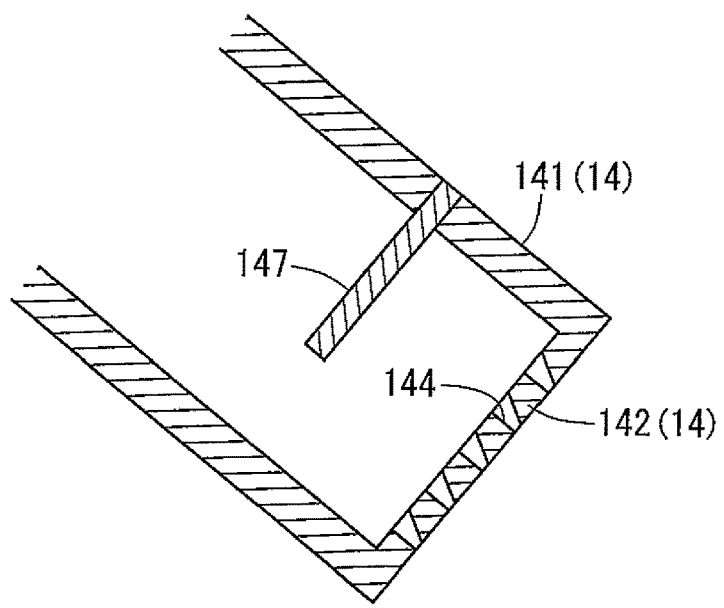
FIG. 9 is an enlarged longitudinal sectional view of a protruding-side end part of a second port of a fourth embodiment of a dust filter for an evaporated fuel treatment device of a vehicle.

FIG. 9 is an enlarged longitudinal sectional view of a protruding-side end part of a second port of a dust filter according to a fourth embodiment. A feature of the fourth embodiment, as compared to the second embodiment (e.g., see FIG. 7), is that a shield 147 is provided inside the tubular body 141 of the second port 14. Since the other configurations the fourth embodiment are substantially the same as those of the second embodiment, the description of the substantially same portions will be omitted.

As shown in FIG. 9, the shield 147 is provided inside the tubular body 141 of the second port 14, for instance, in a position between the mesh 142 and the second chamber 124. The shield 147 is configured to block an upper part of the communication passage in the tubular body 141 in the state where the case 12 is mounted on the vehicle. The shield 147 does not extend to the lower part of the communication passage in the tubular body 141. Therefore, the communication passage in the tubular body 141 is not be entirely blocked.

According to the fourth embodiment, water may be prevented from entering the second chamber 124. For example, even if the water at the time of car washing hits the mesh 142 vigorously enough that the water passes through one or more of the small holes 144 and enters the tubular body 141, the water may hit the shield 147 and bounce off. Therefore, the shield 147 may prevent the water from entering the second chamber 124. Since the shield 147 does not block the lower part of the tubular body 141, the water accumulated on the inner wall surface(s) defining the second chamber 124 of the second case portion 122 may still be drained from the tubular body 141 without being affected by the shield 147. It is preferable to adjust the position of the shield 147 within the tubular body 141 in the anticipated direction in which foreign substances, such as water, are expected to enter from the outside of the tubular body 141. Despite this, it is necessary to consider securing a drainage flow path on the lower side of the tubular body 141.

Although the arts disclosed in the present disclosure have been described for specific embodiments, they may be implemented in various other embodiments. For example, although the dust filter 10 is fixed to the inlet pipe 32 in the above embodiment, it may instead be fixed at another position. The second port 14 may have a cylindrical or square cylinder shape protruding to the outside of the case 12. Alternatively, the second port 14 may merely form a hole opened in a wall surface of the case 12. Further, it is preferable that the position of the second port 14 on the case 12 is located at a position lower than the case 12 in the state where the case 12 is mounted on the vehicle. It is preferable if the position of the second port 14 is set to the lowest position of the case 12, so that the water does not remain in the case 12. However, the second port 14 is not limited to the above-mentioned position. The shield 147 may be formed by deforming the wall surface constituting the tubular body 141 such that the side where the communication passage is narrowed.

The various examples described above in detail with reference to the attached drawings are intended to be representative of the present disclosure and are thus non-limiting embodiments. The detailed description is intended to teach a person of skill in the art to make, use, and/or practice various aspects of the present teachings, and thus does not limit the scope of the disclosure in any manner. Furthermore, each of the additional features and teachings disclosed above may be applied and/or used separately or with other features and teachings in any combination thereof, to provide an improved dust filter, and/or methods of making and using the same.

What is claimed is:

1. A dust filter configured to be disposed along an atmospheric passage for introducing atmospheric air into a fuel vapor treatment device, the dust filter comprising:
   a case;
   a filter medium disposed in the case, wherein the filter medium divides an interior of the case into a first chamber disposed on one side of the filter medium and a second chamber disposed on another side of the filter medium;
   wherein the case includes:
      a first port configured to provide fluid communication between the first chamber and the atmospheric passage, and
      a second port configured to provide fluid communication between the second chamber and the atmosphere outside the case, and
   wherein the first port and the second port are arranged so that a center line of the first port is nonparallel and misaligned with a center line of the second port.

2. The dust filter of claim 1, wherein:
   the second port comprises a tubular body defining a communication passage having an entrance at one end and an exit at another end,
   the tubular body extends outwardly from the case, and
   the second port is arranged such that a protruding-side end part of the tubular body distal the case is below a case-side end part of the tubular body proximal the case in the state where the case is mounted on the vehicle.

3. The dust filter of claim 1, wherein the second port comprises a mesh extending across the communication port, wherein the mesh includes a plurality of holes therethrough arranged in a grid pattern.

4. The dust filter of claim 3, wherein each hole in the mesh is defined by an has an annular frustoconical wall surface such that each hole has an opening area that gradually decreases moving along the hole from proximal the case to distal the case.

5. The dust filter of claim 3, wherein:
   each hole in the mesh is defined by an annular wall surface including a lower-side wall surface and an upper-side wall surface in a side cross-sectional view in the state where the case is mounted on the vehicle, and
   the lower-side wall surface is oriented at a first angle relative to a center line of the hole in the side cross-sectional view and the upper-side wall surface is oriented at a second angle relative to the centerline of the hole in a side cross-sectional view;
   the first angle is less than the second angle.

6. The dust filter of claim 3, wherein the mesh includes a backflow prevention means configured to enable the water accumulated in the case to drain outside the case and to suppress infiltration of the foreign substances from the outside of the case.

7. The dust filter of claim 2, wherein:
   the tubular body of the second port comprises a shield at an inside thereof,
   the shield is configured to block an upper part of a cross section of the communication passage,
   the shield does not block a lower part of the cross section of the communication passage, and
   the shield is configured to suppress infiltration of the foreign substances from the outside of the case in the state where the case is mounted on the vehicle.

8. The dust filter of claim 2, wherein the tubular body of the second port has a shape configured to directly connect to a connector for supplying air having a pressure higher than atmospheric pressure to the second chamber when performing an airtight performance confirmation test for the evaporative fuel treatment device.

9. The dust filter of claim 2, wherein a lower surface of the tubular body of the second port is continuous with a lower surface of the second chamber in the state where the case is mounted on the vehicle.

10. The dust filter of claim 1, wherein the case has an external concave surface that is configured to engage with a cylindrical pipe.

11. A dust filter configured to be disposed along an atmospheric passage for introducing atmospheric air into a fuel vapor treatment device, the dust filter comprising:
   a case;
   a filter medium disposed in the case, wherein the filter medium divides an interior of the case into a first chamber disposed on one side of the filter medium and a second chamber disposed on another side of the filter medium;
   wherein the case includes:
      a first port configured to provide fluid communication between the first chamber and the atmospheric passage, and
      a second port configured to provide fluid communication between the second chamber and the atmosphere outside the case, and wherein the case has an external concave surface that is configured to engage with a cylindrical pipe.

* * * * *